(12) United States Patent
Rinderer

(10) Patent No.: US 7,472,875 B2
(45) Date of Patent: Jan. 6, 2009

(54) BRACKET FOR MOUNTING AN ELECTRICAL DEVICE

(75) Inventor: Eric R. Rinderer, Highland, IL (US)

(73) Assignee: Cooper Technologies Company, Houston, TX (US)

( * ) Notice: Subject to any disclaimer, the term of this patent is extended or adjusted under 35 U.S.C. 154(b) by 494 days.

(21) Appl. No.: 11/093,145

(22) Filed: Mar. 29, 2005

(65) Prior Publication Data

US 2006/0237601 A1 Oct. 26, 2006

(51) Int. Cl.
*E04G 3/00* (2006.01)

(52) U.S. Cl. ............... 248/200.1; 248/906; 220/3.3

(58) Field of Classification Search ........... 248/906, 248/200.1, 218.4, 205.1; 220/3.3, 3.5, 3.6, 220/3.9
See application file for complete search history.

(56) References Cited

U.S. PATENT DOCUMENTS

| | | |
|---|---|---|
| 1,056,759 A | 3/1913 | Mallery |
| 1,506,330 A | 8/1924 | Vandy |
| 1,756,361 A | 4/1930 | Johnson |
| 1,790,031 A | 1/1931 | Vaughn |
| 1,812,756 A | 6/1931 | Riggs |
| 1,855,751 A | 4/1932 | Buchanan |
| 1,856,356 A | 5/1932 | Owen |
| 1,906,197 A | 4/1933 | Mangin |
| 2,316,389 A | 4/1943 | Atkinson |
| 2,423,757 A | 7/1947 | Dedge |
| 2,442,340 A | 6/1948 | Buchanan et al. |
| 2,788,188 A | 4/1957 | Smith et al. |
| 2,824,167 A | 2/1958 | Bauer |
| 3,104,087 A | 9/1963 | Budnick et al. |
| 3,214,126 A | 10/1965 | Roos |
| 3,834,658 A | 9/1974 | Theodorides |
| 3,848,224 A | 11/1974 | Olivero |
| 4,050,603 A | 9/1977 | Harris et al. |
| 4,135,337 A | 1/1979 | Medlin |
| 4,210,772 A | 7/1980 | Magana et al. |
| D265,050 S | 6/1982 | Riedl |
| 4,447,030 A | 5/1984 | Nattel |
| RE31,714 E | 10/1984 | Knickerbocker |
| 4,483,453 A | 11/1984 | Smolik |
| 4,533,060 A | 8/1985 | Medlin |

(Continued)

FOREIGN PATENT DOCUMENTS

AU       725473 B2       8/1999

(Continued)

*Primary Examiner*—Korie Chan
*Assistant Examiner*—Steven Marsh
(74) *Attorney, Agent, or Firm*—Senniger Powers LLP

(57) ABSTRACT

This invention relates to a bracket for mounting an electrical box on a mounting bar device. The bracket has a central section having a channel-shaped recess. The bracket also has end sections at opposite ends of the central section. The end section have bar device openings that are generally aligned with the channel-shaped recess of the central section. The bar device openings and the channel-shaped recess are adapted to slidably receive the mounting bar device. The electrical box is secured to the central section of the bracket using a first fastener element. The bracket is secured to the mounting bar device using a second fastener element. The bracket may also be convertible for use in mounting an electrical box on a vertical mounting rod.

10 Claims, 12 Drawing Sheets

U.S. PATENT DOCUMENTS

| | | | |
|---|---|---|---|
| 4,603,789 A | 8/1986 | Medlin, Sr. | |
| 4,645,089 A | 2/1987 | Horsley | |
| 4,747,506 A | 5/1988 | Stuchlik, III | |
| 4,757,967 A | 7/1988 | Delmore et al. | |
| 4,790,505 A | 12/1988 | Rose et al. | |
| 4,894,759 A | 1/1990 | Siems | |
| 4,918,258 A | 4/1990 | Ayer | |
| 4,924,032 A | 5/1990 | Akins | |
| 4,943,022 A | 7/1990 | Rinderer | |
| 4,967,990 A | 11/1990 | Rinderer | |
| 5,044,582 A | 9/1991 | Walters | |
| 5,060,892 A * | 10/1991 | Dougherty | 248/57 |
| 5,065,968 A | 11/1991 | Kesler et al. | |
| 5,114,105 A | 5/1992 | Young | |
| 5,209,444 A | 5/1993 | Rinderer | |
| 5,289,934 A | 3/1994 | Smith et al. | |
| 5,295,644 A | 3/1994 | Ferguson, Jr. | |
| 5,330,137 A | 7/1994 | Oliva | |
| 5,354,952 A | 10/1994 | Hickey | |
| 5,386,959 A * | 2/1995 | Laughlin et al. | 248/205.1 |
| 5,405,111 A | 4/1995 | Medlin, Jr. | |
| 5,408,045 A | 4/1995 | Jorgensen et al. | |
| 5,452,873 A | 9/1995 | Laughlin | |
| 5,484,076 A | 1/1996 | Petrushka | |
| 5,525,754 A | 6/1996 | Akins | |
| 5,527,990 A | 6/1996 | Comerci et al. | |
| 5,533,060 A | 7/1996 | Kameo et al. | |
| 5,598,670 A | 2/1997 | Humphrey et al. | |
| 5,646,371 A | 7/1997 | Fabian | |
| 5,698,820 A | 12/1997 | Collard | |
| 5,722,208 A | 3/1998 | Humphrey et al. | |
| 5,785,551 A | 7/1998 | Libby | |
| 5,883,332 A | 3/1999 | Collard | |
| 5,931,425 A | 8/1999 | Oliva | |
| 5,954,304 A | 9/1999 | Jorgensen | |
| 6,047,517 A | 4/2000 | Vrame | |
| 6,070,957 A * | 6/2000 | Zachrai | 312/334.4 |
| 6,201,187 B1 | 3/2001 | Burbine | |
| D449,218 S | 10/2001 | Vrame | |
| 6,376,770 B1 | 4/2002 | Hyde | |
| 6,384,334 B1 | 5/2002 | Webb | |
| 6,484,979 B1 | 11/2002 | Medlin, Jr. | |
| 6,484,980 B2 | 11/2002 | Medlin, Sr. et al. | |
| 6,563,049 B2 | 5/2003 | May | |
| 6,617,511 B2 | 9/2003 | Schultz et al. | |
| 6,666,419 B1 | 12/2003 | Vrame | |
| 2002/0050547 A1 | 5/2002 | Medlin, Sr. et al. | |
| 2003/0010520 A1 | 1/2003 | Ewald et al. | |
| 2003/0034167 A1 | 2/2003 | DeLand | |
| 2004/0007378 A1 | 1/2004 | Vrame | |

FOREIGN PATENT DOCUMENTS

| | | |
|---|---|---|
| EP | 0 046 124 A1 | 2/1982 |
| TW | 416174 | 12/2000 |

* cited by examiner

BRACKET FOR MOUNTING AN ELECTRICAL DEVICE

BACKGROUND OF INVENTION

This invention relates generally to a device for mounting an electrical box, and more particularly, to a bracket which is particularly suited for mounting a pre-wired electrical box. Electrical boxes (also referred to as "junction boxes") are used to house and protect electrical devices such as electrical outlets, switches and associated wiring when the devices are installed in a building. Typically, an electrical device is installed either by securing the junction box containing the device directly to framing within the structure, or by securing the box to a mounting device that is fastened to such framing. One such box mounting device is described in U.S. Pat. No. 5,209,444. The device comprises a mounting bar having fastening flaps at opposite ends of the bar for securement to spaced apart wall studs. When the flaps are secured to the studs, the bar extends generally horizontally between the studs. The bar has a generally channel-shaped cross-section, and a plurality of box mounting openings are spaced along the length of the bar for receiving fasteners to secure an electrical box to the bar at a selected location.

Other types of mounting devices have been used for securing electrical boxes on a vertical rod attached to framing in a building. Examples of such mounting devices are described in U.S. Pat. Nos. 5,354,952 and 5,883,332.

To attach an electrical box to mounting devices of the type described above, fasteners are typically inserted through openings in the rear wall of the box into selected openings in the mounting device. In the case of the box mounting bar described above, the particular openings selected will depend on the desired position of the box relative the framing of the building. The procedure is typically carried out at the job site when the box is empty (before installation of an electrical device in the box) so that the installer has uninhibited access to box and there is no risk of damage to the contents of the box. After the box is fastened to the mounting device, the electrical device is installed in the box and wired. This installation step may follow or precede the step of securing the mounting device to the framing or vertical rod in the building.

The above procedure cannot be used if the box is "pre-wired", that is, if the electrical device is installed in the box at a location other than job site. In this situation, the empty box must be secured to the appropriate mounting device at a remote location, the electrical device wired in the box, and the "pre-wired" box then transported to the installation site. However, a problem arises if there is a need to adjust the position of the box on the mounting device at the job site, since any such adjustment would require the installer to remove the electrical device from the electrical box, reposition the box on the mounting device, and then replace the electrical device in the box, or some other time-consuming and expensive procedure.

Similarly, the conventional procedure is unsatisfactory if the electrical box and associated mounting device are pre-assembled (referred to as a pre-assembled electrical box assembly). A pre-assembled electrical box assembly is an electrical box (and optionally, but not necessarily an electrical device) that is mounted on the mounting device at a location other than the job site. Like with a pre-wired electrical device, because the electrical box of a pre-assembled box assembly is already secured to the bar device being shipped, a problem arises if there is a need to adjust the position of the box on the mounting device at the job site. In effect, the box would have to be removed from the bar, and any assembled components may have to be disassembled, thereby negating any advantage of pre-assembly.

There is a need, therefore, for an improved device for mounting electrical boxes, including pre-wired electrical boxes and pre-assembled electrical box assemblies.

There is a need also for a device that aids in the proper installation of a pre-wired electrical box and a pre-assembled electrical box assembly.

Further, there is a need for a device that allows a user to position and secure an electrical box to either a mounting bar or a mounting rod.

SUMMARY OF THE INVENTION

In general, this invention relates to a bracket for mounting an electrical box on a mounting bar device of the type having an elongate bracket mounting section and a pair of fastening sections at opposite ends of the bracket mounting section adapted to be secured to spaced apart wall studs such that the bracket mounting section extends between the wall studs when the fastening sections are secured to the studs. The bracket comprises a central section having opposite ends and a generally channel-shaped recess therein extending from one end of the central section to the opposite end of the central section. The bracket also has at least a first fastener element for use in securing the electrical box to the central section of the bracket. End sections at opposite ends of the central section have bar device openings generally aligned with the channel-shaped recess of the central section. The channel-shaped recess and the aligned bar device openings are adapted to slidably receive the bracket mounting section of the mounting bar device whereby the bracket may be slidably moved along the bracket mounting section to a selected position. A second fastener element is used in securing at least one of the end sections of the bracket to the bracket mounting section of the mounting bar device in the selected position.

In another aspect, this invention relates to a convertible bracket for selectively mounting an electrical box on either an elongate generally horizontal mounting bar device or on an elongate vertical mounting rod. The bracket comprises a bracket member. The bracket member is bendable between a first mounting configuration in which the bracket member is adapted to be mounted on the mounting bar device such that the bracket member is slidable along the bar device, and a second mounting configuration in which the bracket member is adapted to be mounted on the mounting rod such that the bracket member is slidable along the rod. At least a first fastener element on the bracket member is used to secure the electrical box to the bracket.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENT

Figure 1:
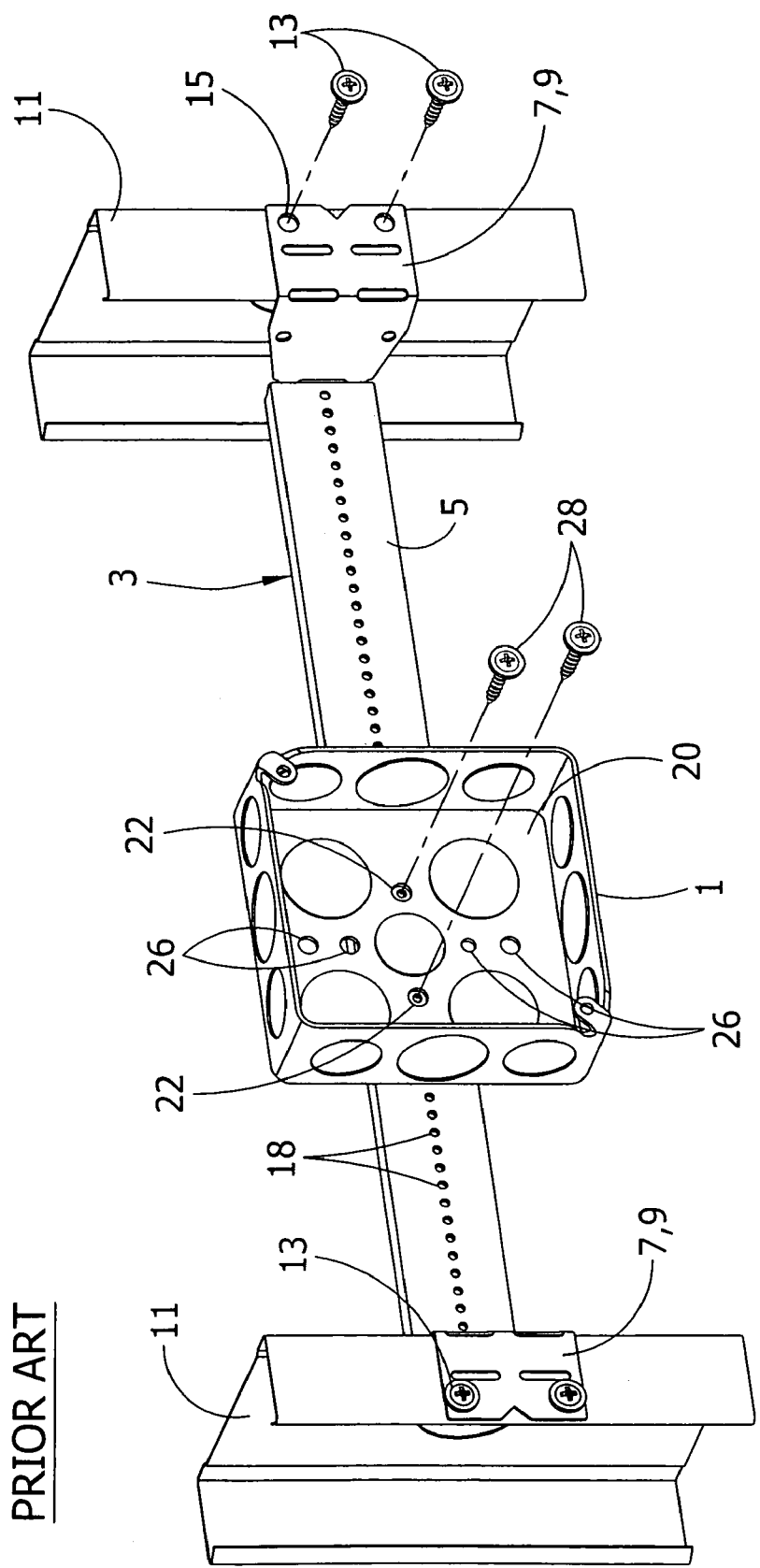
FIG. 1 is perspective view of an electrical box mounted on a prior art mounting bar device.

Referring now to the drawings, FIG. 1 illustrates an electrical box 1 secured to a horizontal mounting bar device, generally indicated at 3. The illustrated mounting bar device 3 is of the type generally referred to as an adjustable mounting bar or a telescoping bar. An exemplary adjustable mounting bar is described in detail in U.S. Pat. No. 5,209,444, which is herein incorporated by reference. The horizontal mounting bar device 3 comprises a generally elongate mounting section 5 and a pair of fastening sections 7 at opposite ends of the mounting section. The fastening sections 7, comprising a pair of fastening flaps 9, are secured to a pair of spaced apart wall studs 11 such that the mounting section 5 of the bar device 3 extends generally horizontally between the studs. Suitable fasteners 13 are inserted through openings 15 in the fastening flaps 9 to secure the flaps to the studs 11. The mounting section 5 of the bar device 3 has a series of aligned box fastening openings 18 extending along the length of the bar device. A rear wall 20 of the electrical box 1 has a pair of spaced apart openings 22 horizontally offset from the center of the box. The electrical box 1 also has a pair of openings 26 vertically offset from the center of the box. To secure the electrical box 1 to the bar device 3, the horizontal openings 22 in the electrical box are aligned with a pair of box fastening openings 18 along the length of the bar device. Suitable fasteners 28 (e.g., threaded screws) are inserted through the aligned openings 22, 18, thereby securing the electrical box 1 to the bar device 3. It is understood that the illustrated electrical box is empty and that to complete the installation, an electrical device, such as an electrical outlet or switch, is placed in the box and wired.

Figure 2:
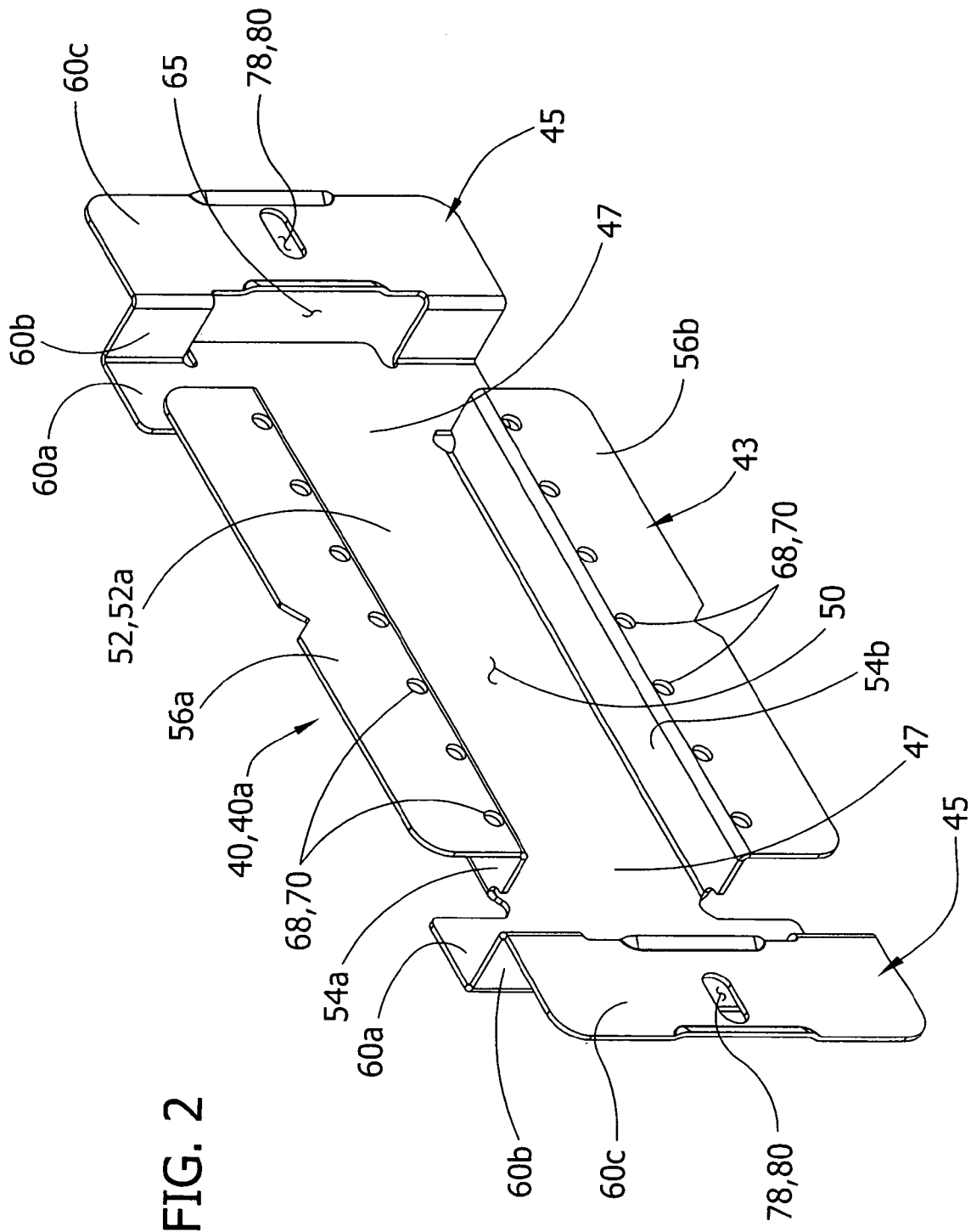
FIG. 2 is a perspective view of one embodiment of a bracket of the present invention.
Figure 3:
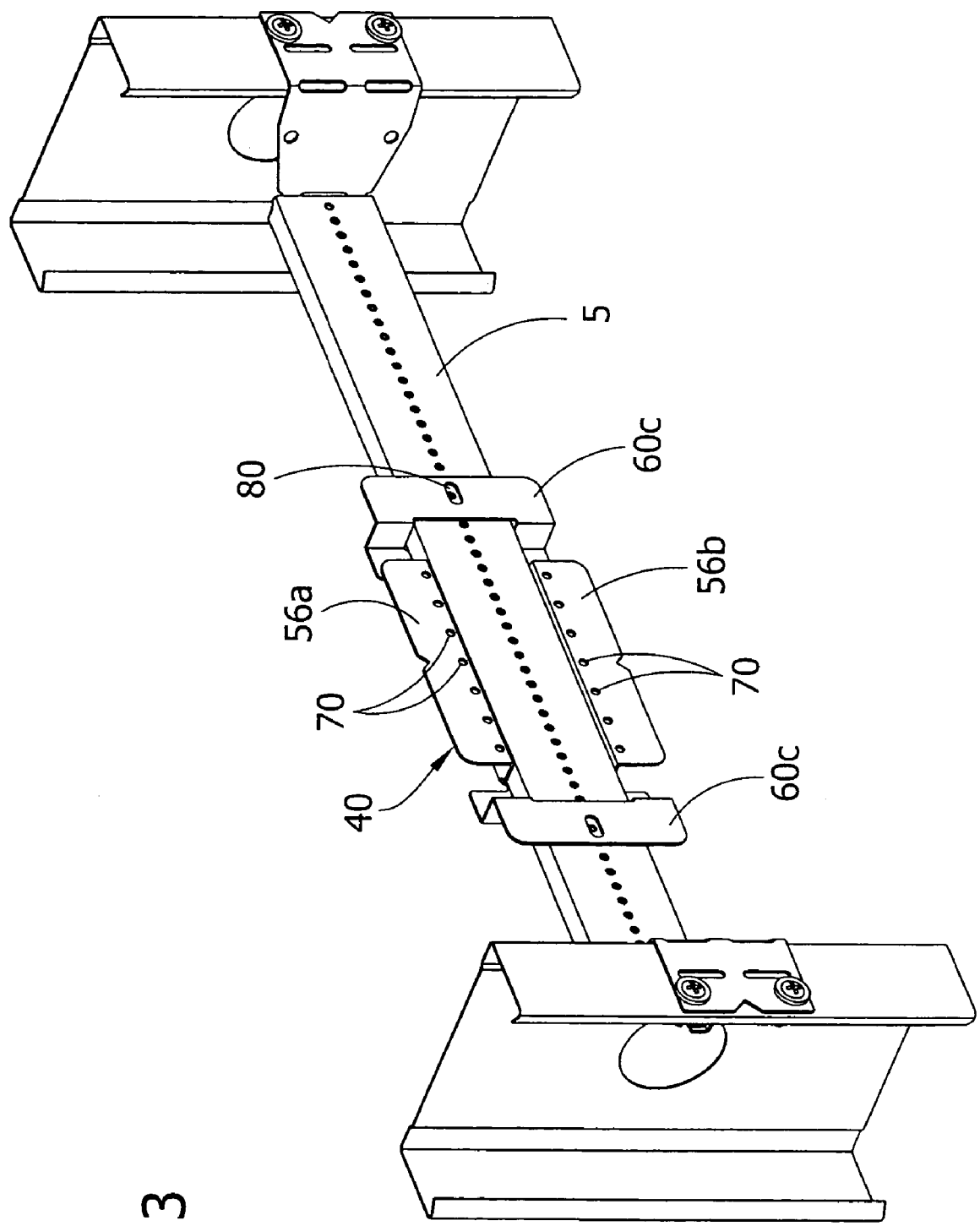
FIG. 3 is a perspective view of the bracket of FIG. 2 positioned on the mounting bar device of FIG. 1.
Figure 4:
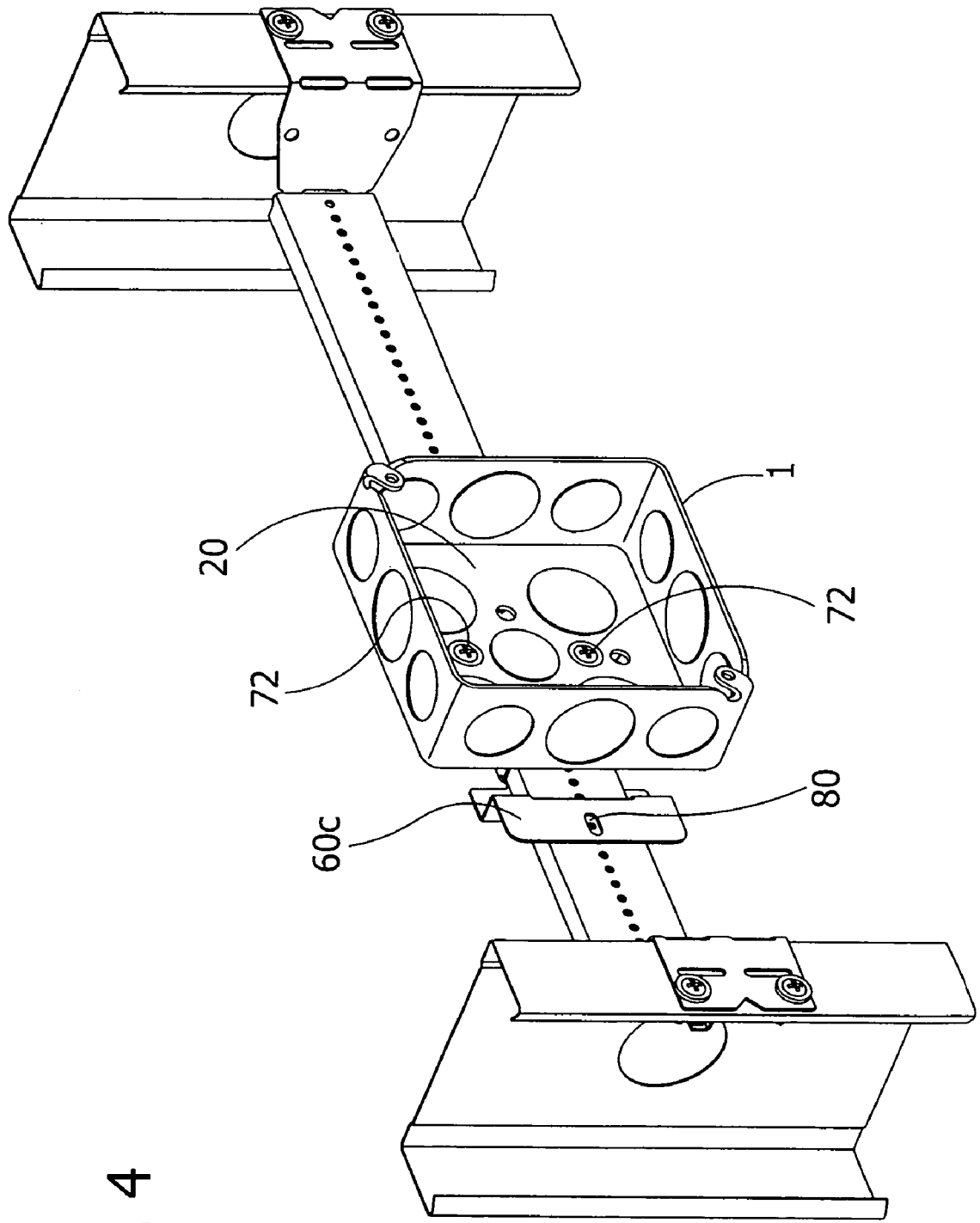
FIG. 4 is a perspective view of an electrical box secured to the bracket of FIG. 3.

Referring now to the present invention, FIGS. 2-4 illustrate a first embodiment of a bracket of the present invention, generally indicated at 40, for use in mounting an electrical box 1 to a horizontal mounting bar device 3 of the type referred to above. As best shown in FIG. 2, the bracket 40 comprises a bracket member 40A having a central section, generally indicated at 43, and opposite end sections, generally indicated at 45. The central section 43 of the bracket 40 has opposite ends 47 and a generally channel-shaped recess 50 therein extending from one end of the central section to the opposite end of the central section. The recess 50 is defined by a rear wall 52 and opposing upper and lower walls 54a, 54b extending forward from the rear wall. The rear wall 52 has an inner surface 52a and an outer surface 52b. (The outer surface is hidden in FIG. 2, but can be seen in FIG. 9.) An upper flange 56a extends generally upward from the upper wall 54a, and a lower flange 56b extends generally downward from the lower wall 54b. It is understood that other configurations of the central section of the bracket are contemplated and within the scope of this invention.

In one embodiment, each end section 45 of the bracket 40 has a generally Z-shaped configuration comprising a first region 60a, a second region 60b, and a third region 60c. The first region 60a extends generally laterally from and is generally coplanar with the rear wall 52 of the central section 43 of the bracket 40. The second region 60b extends forward from and generally perpendicular to the first region 60a. The third region 60c extends laterally from the second region 60b in a direction away from the central section 43 of the bracket 40. The third region 60c is generally coplanar with the upper and lower flanges 56a, 56b of the bracket 40. Other end section configurations are contemplated and within the scope of this invention.

The second regions 60b of the end sections 45 of the bracket 40 are formed with bar device openings 65 generally aligned with the channel-shaped recess 50 of the bracket. (Only one bar device opening is visible in FIG. 2). As best shown in FIG. 3, the aligned channel-shaped recess 50 and bar device openings 65 are adapted to snugly and slidably receive the bracket mounting section 5 of the mounting bar device 3. In the illustrated embodiment, the openings 65 are generally rectangular for receiving a mounting bar device having a rectangular or channel-shaped cross-section. The shapes and/or sizes of the bar device openings 65 may vary without departing from the scope of this invention. Once positioned on the mounting bar device 3, the bracket 40 may be slidably moved along the bracket mounting section 5 of the device to a selected position. It is understood that the locations of the bar device openings 65 in the end sections 45 may vary without departing from the scope of this invention.

The bracket 40 has a first fastener element 68 for use in securing the electrical box 1 to the central section 43 of the bracket 40 while still allowing the bracket to slide along the box mounting section 5 of the bar device 3. In one embodiment, the first fastener element 68 comprises a plurality of horizontally aligned box fastener openings 70 disposed in the upper and lower flanges 56a, 56b of the bracket 40. As shown in FIG. 4, these openings are adapted for receiving one or more suitable box fasteners 72 (e.g., threaded fasteners) that are inserted through one or more vertical openings 26 in the rear wall 20 of the electrical box 1. The user merely aligns the vertical openings 26 in the box 1 with one of the box fastener openings 70 in each of the respective upper and lower flanges 56a, 56b. When the electrical box 1 is secured to the bracket 40, the bracket is still slidable along the mounting section 5 of the mounting bar device 3. Other means of securing the electrical box 1 to the bracket 40 are contemplated and within the scope of this invention. For example, the first fastener element 68 may comprise at least one bendable tab on the bracket adapted to be received in a rear wall opening of the electrical box. Moreover, the location of the first fastener element may vary without departing from the scope of the invention.

The bracket 40 has a second fastener element 78 for use in securing the end sections 45 of the bracket to the bar device 5 in a selected position along the bar device. In one embodiment, the second fastener element 78 comprises a pair of bracket fastener openings 80 located in the third regions 60c of the end sections 45 of the bracket 40. After the box 1 is attached to the bracket 40, for example, the bracket may be slidably moved to a selected position on the bar device 3 in which the bracket fastener openings 80 in the end sections 45 are aligned with the respective openings 18 in the bar device 3. Suitable fasteners 85 (FIG. 5) are then inserted through the slots 80 into the aligned openings 18 in the bar 3 to secure the bracket 40 in position on the bar. In the illustrated embodiment, the bracket fastener openings 80 are slots. The slots allow a degree of horizontal movement of the bracket 40 relative to the selected opening 18 in the bar 3. Other types of second fastener elements 78 besides openings 80 are contemplated and within the scope of this invention. For example, the second fastener element may comprise at least one bendable tab adapted to be inserted into a fastener opening in the bar device to secure the bracket to the bar device.

Preferably, the distance between the bracket fastener openings 80 is greater than the width of the electrical box 1, such that the openings are readily accessible to the user when the electrical box is mounted on the bracket 40. That is, the electrical box 1, when secured to the bracket 40, does not obstruct access to the openings 80. Preferably, when the electrical box 1 is secured to the bracket 40, the distance between the openings 80 and the electrical box 1 is between about 0.25 inches and 1.0 inches. The standard widths of two different types of electrical boxes are 4 inches and $4^{11}/_{16}$ inches. Accordingly, the distance between the openings 80 is preferably between about 5.25 inches and 6.75 inches. Other distances between the openings 80 are contemplated.

In some situations it may be necessary or desirable to secure an electrical box to the bracket member (using box fastener openings 70) in a position in which the box obstructs the bracket fastener opening 80 in one end section 45 of the bracket member 40A. For example, it may be desirable to secure two electrical boxes 1 to the same mounting bar in positions where the boxes are relatively closely spaced or abutting one another. This can be accomplished by first fastening the two bracket members 40a to the mounting bar 3 in positions where the bracket members are closely spaced or abutting end-to-end, and then attaching the boxes 1 to respective bracket members using the appropriate box fastener openings 70 to achieve the desired box spacing, or vice versa. Given the close proximity of the boxes 1 in these situations, the boxes may actually obstruct one or more of the bracket fastener openings 80 in the two bracket members 40A (e.g., the two openings 80 in adjacent and abutting end sections of the bracket members). In this situation, the bracket members 40A are secured to the mounting bar 3 using only the unobstructed openings 80. In another example, it may be desirable to mount an electrical box 1 close to a wall stud, e.g., so close to the stud that the box obstructs the fastener opening 80 closest the stud. In this situation, the bracket member 40A is secured to the mounting bar 3 using the bracket fastener opening 80 in the end section 45 of the bracket member farthest from the wall stud.

The bracket 40 is preferably formed from one piece of metal using a progressive die assembly in a stamping operation, or by other means known in the art.

Figure 5:
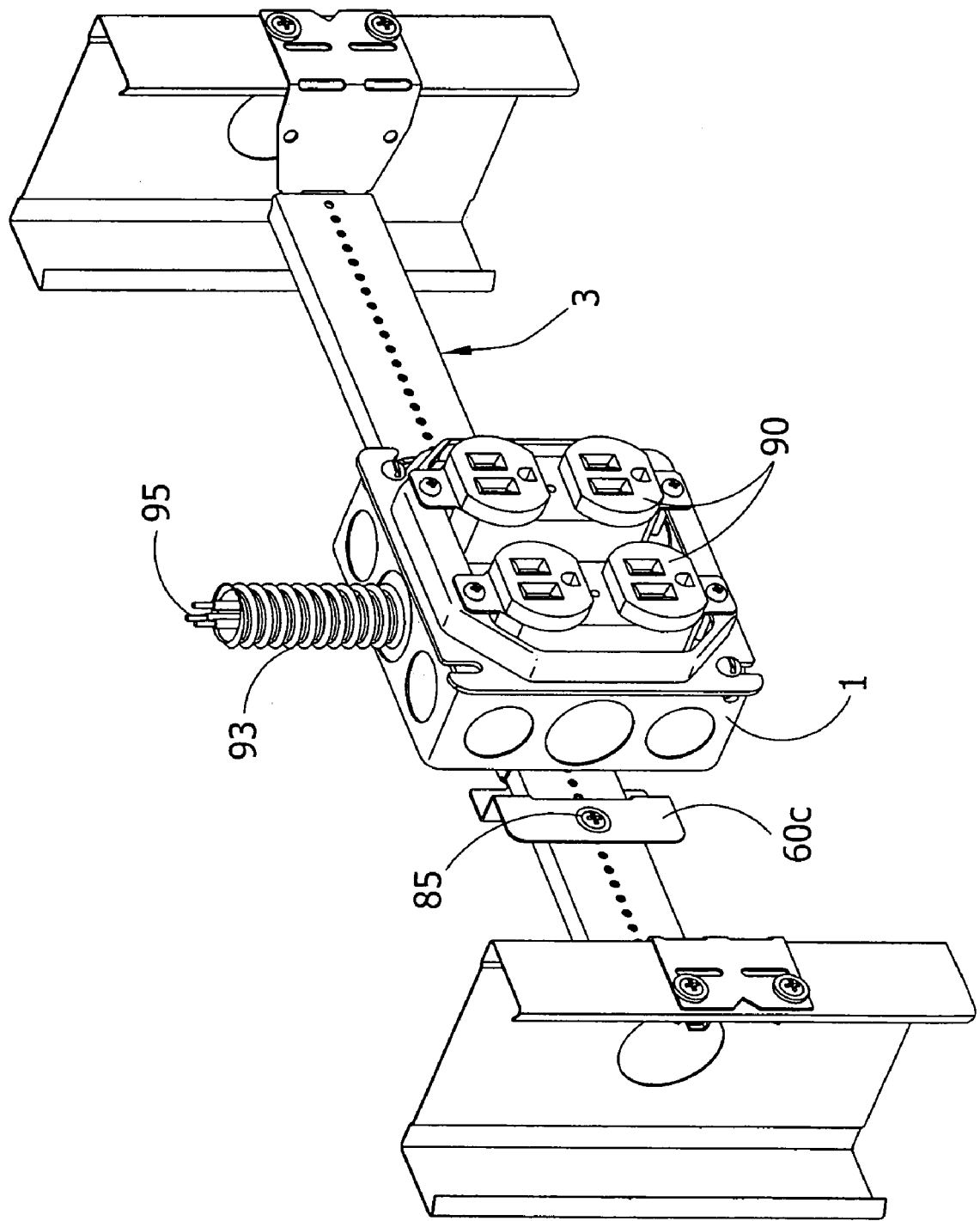
FIG. 5 is a perspective view of a pre-wired electrical box secured to the bracket of FIG. 3.

The bracket 40 of the present invention is particularly useful for mounting a pre-wired electrical device 90, as shown in FIG. 5. An empty electrical box 1 is first attached to the bracket 40 of the present invention. The pre-wired electrical device 90 is then wired in the box 1 using, for example, one or more flexible conduits 93 housing wires 95. After the device 90 is wired in the box 1, the bracket 40 may be slidably installed on the mounting bar device 3, moved to a selected position along the device, and then secured to the bar device. Because the box 1, when secured to the bracket 40, does not obstruct access to one or both of the bracket fastener openings 80 in the bracket, the bracket can be easily and readily secured to the bar device 3 after the box is wired. In one example, an electrical box 1 is attached to the bracket 40 and a pre-wired device 90 is wired in the box at a location remote from the installation site. The bracket 40, electrical box 1 and pre-wired device 90 are then shipped as an assembly to the installation site where the bracket is slidably installed on the mounting bar device 3, moved to a selected position, and finally secured to the bar device. As another example, the bracket 40, electrical box 1 and pre-wired electrical device 90 are installed on the mounting bar device 3 at a location remote from the installation site. In this example, the bracket 40 is either permanently secured to the bar 3, or temporarily secured to the bar, or is freely slidable on the bar when the assembly is shipped to the installation site. Other variations of the installation process are contemplated and within the scope of this invention.

The bracket 40 of the present invention is also advantageous for use in pre-assembled electrical box assemblies. A pre-assembled electrical box assembly is assembled at least in part at a location remote from the job site. The pre-assembled box assembly would comprise the bracket 40 and an electrical box 1 secured to the bracket. In one example, the bracket is slidably installed on a bar device, and, also optionally, a mud ring, and/or an electrical device would be secured (either temporarily or permanently) to the electrical box. An empty box 1 is attached to a bracket 40 of the present invention at a location remote from the job site. The bracket 40 and associated box 1 is then slidably installed on the mounting bar device 3. This assembly can then be shipped to the job site, where the bar 3 is secured to wall studs, and the electrical box 1 is easily and slidably positioned on the bar. In another example, at the remote location, a mud ring, electrical device, or other components are secured (either temporarily or permanently) to the electrical box, and then the assembly is shipped to the job site for installation. Other variations of the installation process are contemplated and within the scope of this invention.

It is understood that the order of the steps involved in the installation process, and/or the location(s) at which the steps are carried out, may vary without departing from the scope of this invention. It is also understood that the bracket may be used in other ways, besides being used with a pre-wired electrical box or a pre-assembled electrical box assembly. For example, in one procedure the bracket 40 is slidably mounted on the bar device 3 before an electrical box is secured to the bracket. An empty electrical box is then secured to the bracket 40 and an electrical device wired therein.

FIGS. 6-10 illustrate another embodiment of a bracket 100 of the present invention that can also be used to mount an electrical box on a vertical mounting rod. The bracket 100 of this embodiment has a bracket member 100A that is convertible between a first configuration (referred to as a mounting bar configuration) for use in mounting an electrical box on a horizontal mounting bar, as described above, and a second configuration (referred to as a rod mounting configuration) for use in mounting an electrical box on a vertical rod. In the embodiment illustrated in FIGS. 6-10, the bracket 100 is structurally similar to the embodiment illustrated in FIGS. 1-4 except that the bracket additionally has rod openings 105 and lines of weakness 110 in its end section 45. Because the brackets 40, 100 are similar, corresponding parts are indicated by corresponding reference numbers for convenience.

Figure 6:
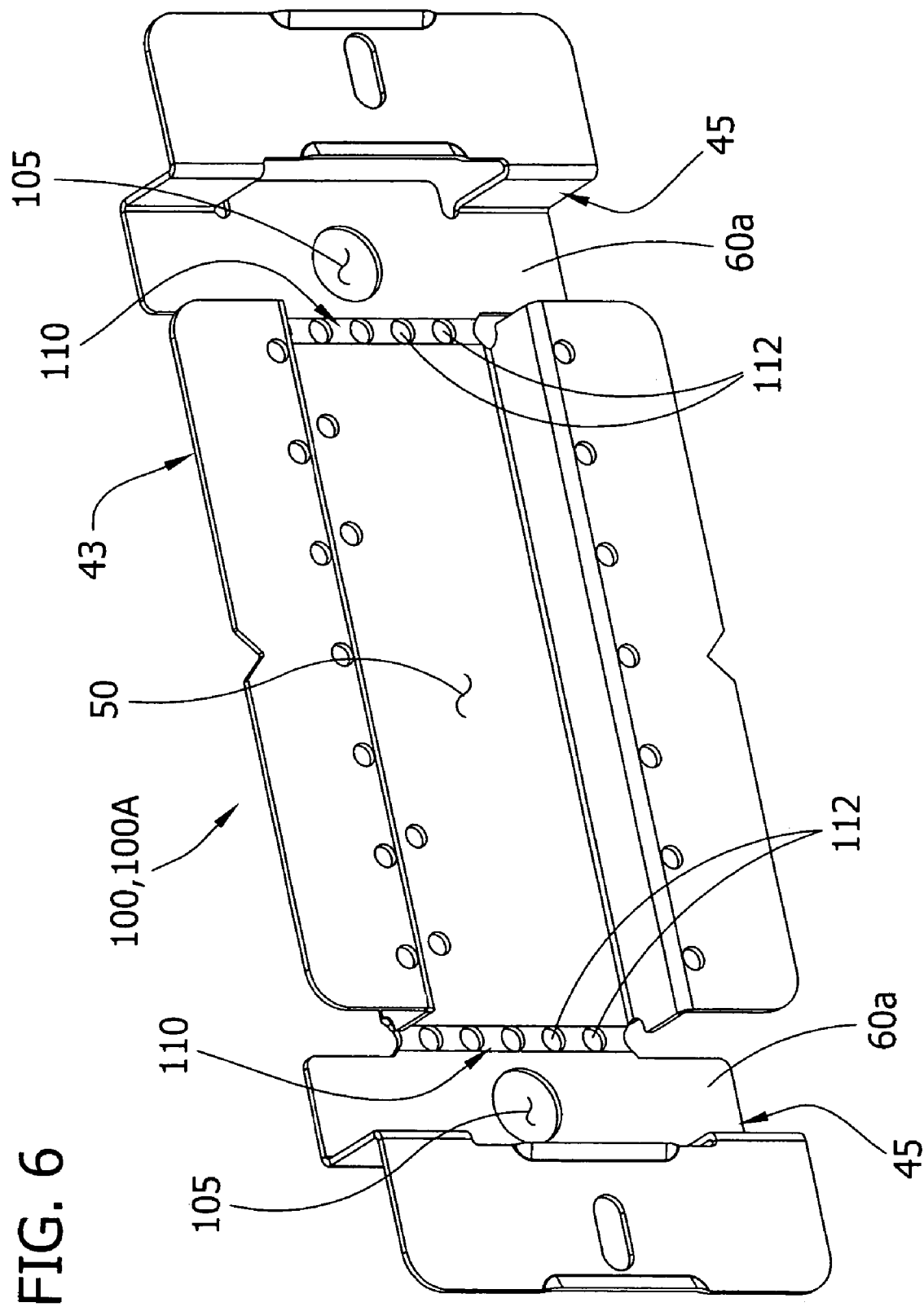
FIG. 6 is a perspective view of another embodiment of a bracket of the present invention in a first mounting configuration in which the bracket is mountable on a mounting bar of the type shown in FIG. 1.

As shown, the rod openings 105 and the lines of weakness 110 are disposed in the first regions 60a of the end sections 45 of the bracket 100. When the bracket member 100A is in the bar mounting configuration, as shown in FIG. 6, the lines of weakness 110 are disposed between the rod openings 105 and the central section 43 of the bracket and run generally transverse to the length of the channel-shaped recess 50. The lines of weakness 110 may comprise, for example, a series of aligned perforations 112. Other means of forming the lines of weakness 110 are contemplated (e.g., score lines).

Figure 7:
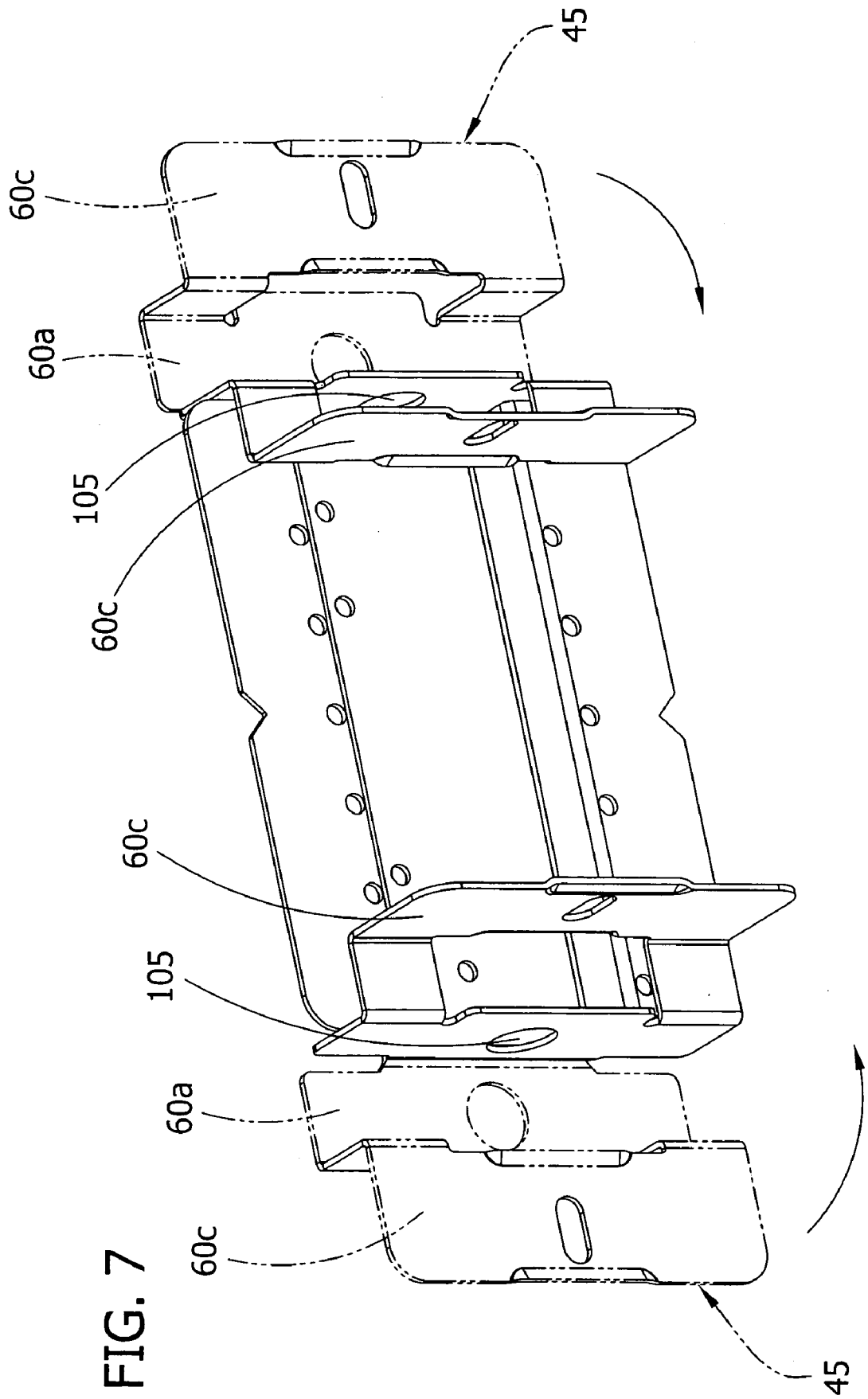
FIG. 7 is a perspective view of the bracket of FIG. 6 bent into a second mounting configuration in which the bracket is mountable on a rod.
Figure 8:
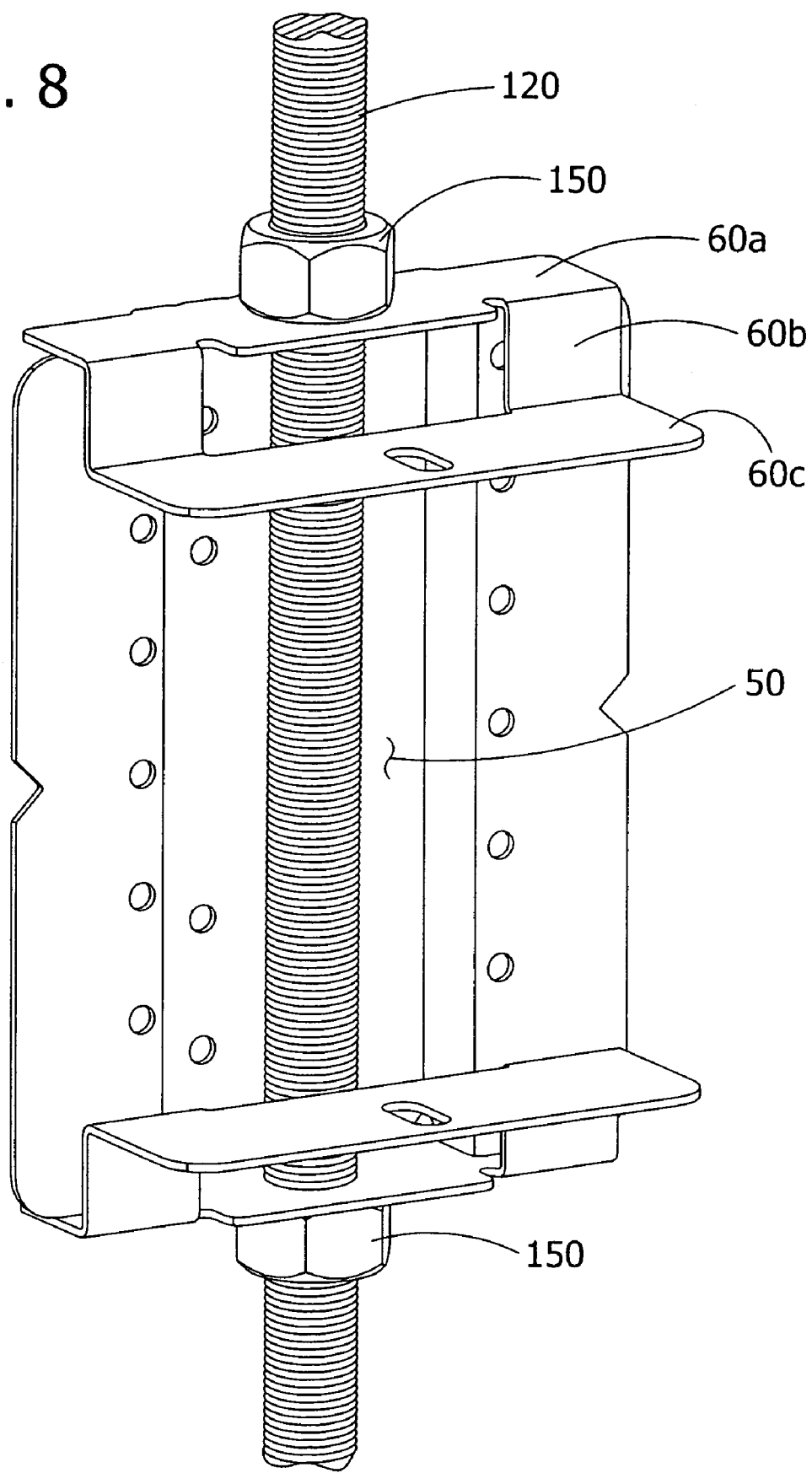
FIG. 8 is a rear perspective view of the bracket of FIG. 7 positioned on a threaded vertical rod.

As shown in FIG. 7, to convert the bracket member 100A from the bar mounting configuration to the rod mounting configuration, the end sections 45 are bent along the lines of weakness 110 so that the rod openings 105 become generally aligned along a central longitudinal axis of the bracket 100. The bracket 100 is rotated about 90 degrees and a vertical rod 120 is inserted through the now vertically aligned rod openings 105, as shown in FIG. 8. (Because the bracket 100 is rotated, the end sections 45 of the bracket in this configuration will be referred to as upper and lower end sections.) The vertical rod 120 is elongate and typically secured to the floor and/or ceiling of a structure using, for example, a threaded anchor, or it may be secured to a beam using, for example, a beam clamp. The illustrated vertical rod 120 (an "all thread" rod) is threaded along its entire length. Rods that are only partially threaded or not threaded are also contemplated. The rod openings 105 in the bracket 100 are preferably sized and shaped to snugly receive the rod 120 while allowing the bracket to be slidably moved along the rod. In the illustrated embodiment, the rod openings 105 are circular for receiving a rod having a circular cross-section. Other shapes and sizes of the rod openings are contemplated and within the scope of this invention.

Figure 9:
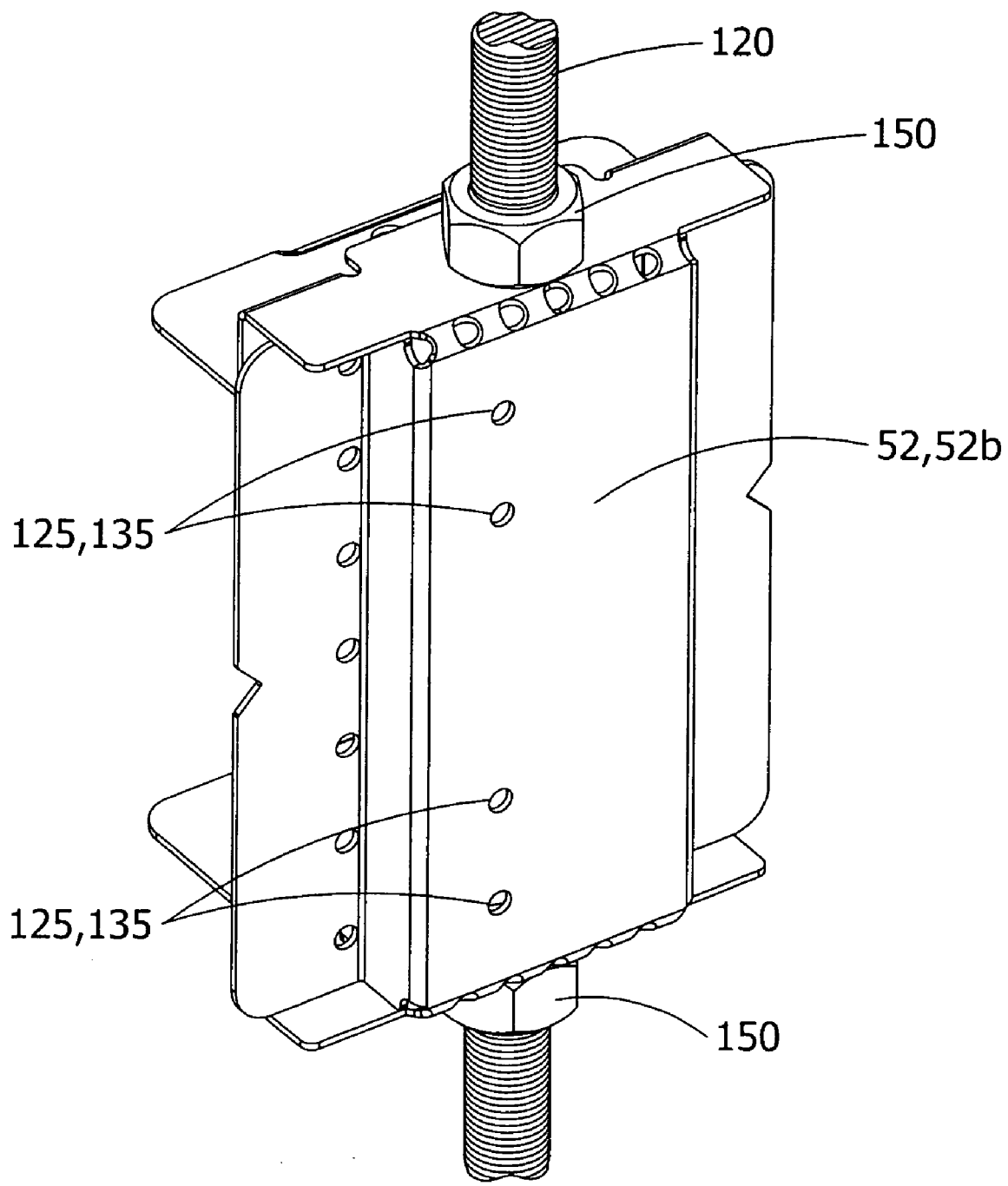
FIG. 9 is a front perspective view of the bracket of FIG. 7 positioned on a threaded vertical rod.
Figure 10:
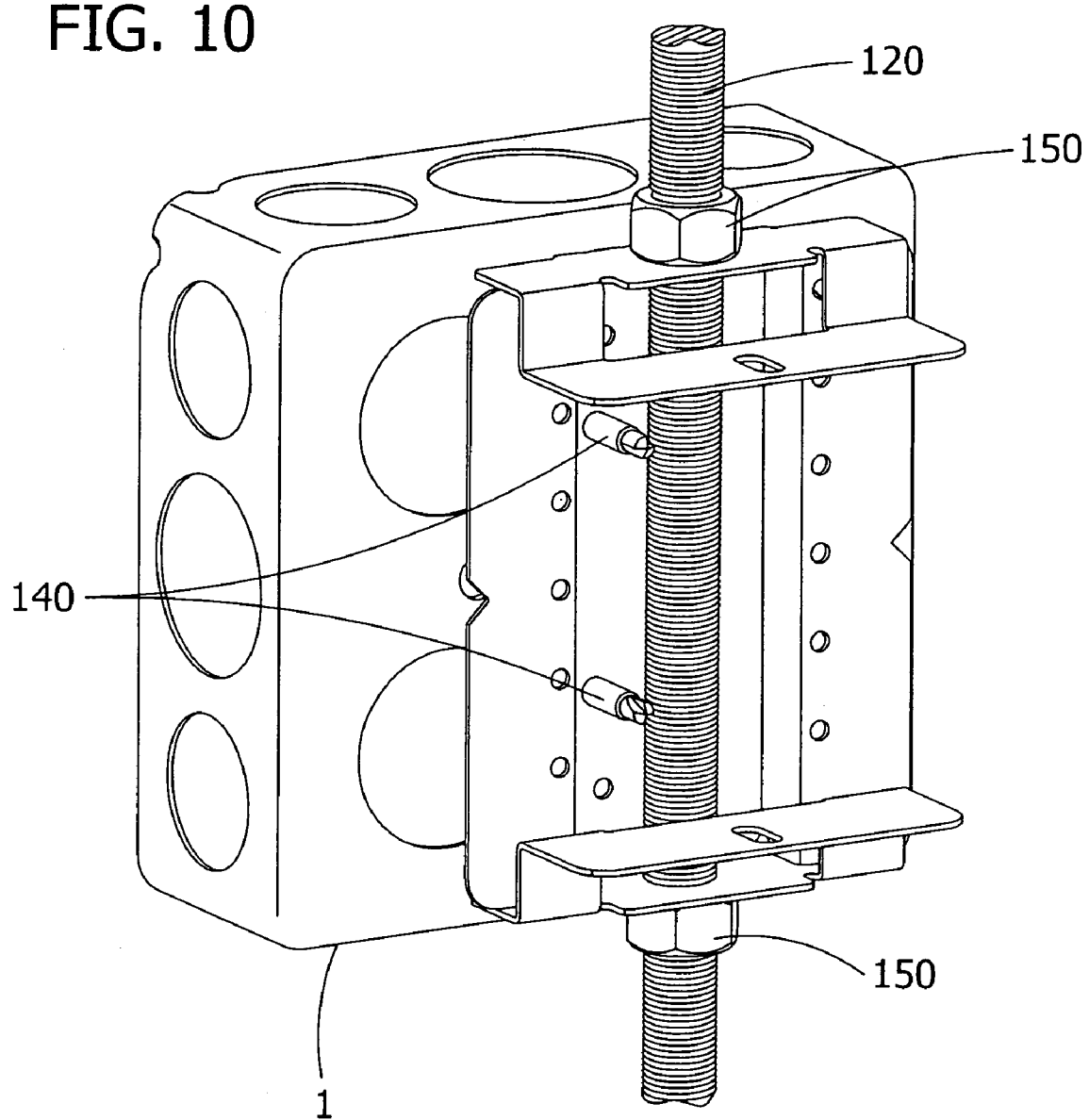
FIG. 10 is the same view as FIG. 8 with an electrical box secured to the bracket.

As illustrated in FIGS. 8 and 9, when the bracket 100 is positioned on the mounting rod 120 via the rod openings 105, the rod is preferably received in the channel-shaped recess 50 of the central section 43 of the bracket. A first fastener element 125 comprising one or more openings is provided in the rear wall 52 of the bracket 100 for use in securing the electrical box 1 to the outer face 52b of the rear wall of the bracket when the bracket is mounted on the rod 120. The rear wall 20 of the electrical box 1 is preferably secured directly to the outer face 52b of the rear wall 52 of the bracket 100 (see FIG. 10). In one embodiment, the first fastener element 125 comprises openings 135 disposed in upper and lower portions of the rear wall 52 (see FIG. 11). The openings 135 are generally vertically aligned and are horizontally offset from the rod openings 105 so that when suitable fasteners 140 are inserted through the openings, the fasteners do not contact the vertical rod (see FIG. 10). As shown in FIG. 10, to secure the electrical box 1 to the outer face 52b of the rear wall 52 of the bracket 100, one or more vertical openings 26 in the rear wall 20 of the box are aligned with one or more openings 135 in the bracket, and one or more suitable fasteners 140 are inserted through the aligned openings. Other means of securing the electrical box 1 to the bracket 100 are contemplated and within the scope of this invention. For example, the first fastener element on the bracket may comprise at least one bendable tab extending from the outer surface of the rear wall. The tab is adapted to be received in a fastener opening in the electrical box for securement of the box to the bracket.

The bracket 100 is secured to the mounting rod 120 using a second fastener element 150, as shown in FIGS. 8-10. As discussed above, the mounting rod 120 is threaded, but it is contemplated that the bracket 100 may be used with a non-threaded rod. In the illustrated embodiment involving an "all thread" rod, the second fastener element 150 comprises a pair of nuts 150 adapted to be threaded on the mounting rod 120 for positioning the bracket 100 on the rod. One nut 150 of the pair (the lower nut in FIG. 9) is threaded on a lower portion of the rod 120 and contacts the lower end section 45 of the bracket 100, and the other nut (the upper nut in FIG. 9) is threaded on an upper portion of the rod and contacts the upper end section of bracket. Thus, the nuts 150 function to retain the bracket 100 in its selected vertical position on the rod 120. Other means of securing the bracket to the rod are contemplated and within the scope of this invention.

As described above, it is understood that the order of the steps involved in the installation process, and/or the location(s) at which the steps are carried out, may vary without departing from the scope of this invention. For example, the bracket may be used with an electrical box housing a pre-wired electrical device, as described above. The pre-wired electrical box may be assembled at a location remote from the installation site and then shipped to the installation site for installation on a vertical mounting rod. As another example, the bracket may be used in a pre-assembled electrical box assembly, as described above.

In another embodiment of the bracket (not shown), the rear wall of the bracket may have central openings that are generally vertically aligned with the rod openings of the bracket. An electrical box be secured directly to a wall when a bracket of this element is in its bar mounting configuration. The third region of the bracket are simply placed flat against the wall and fasteners driven through the bar fastener openings into the wall. The rear wall of the electrical box is secured flat against the outer surface of the rear wall of the bracket using fasteners inserted through openings in the rear wall of the box into aligned central openings in the rear wall of the bracket.

Figure 11:
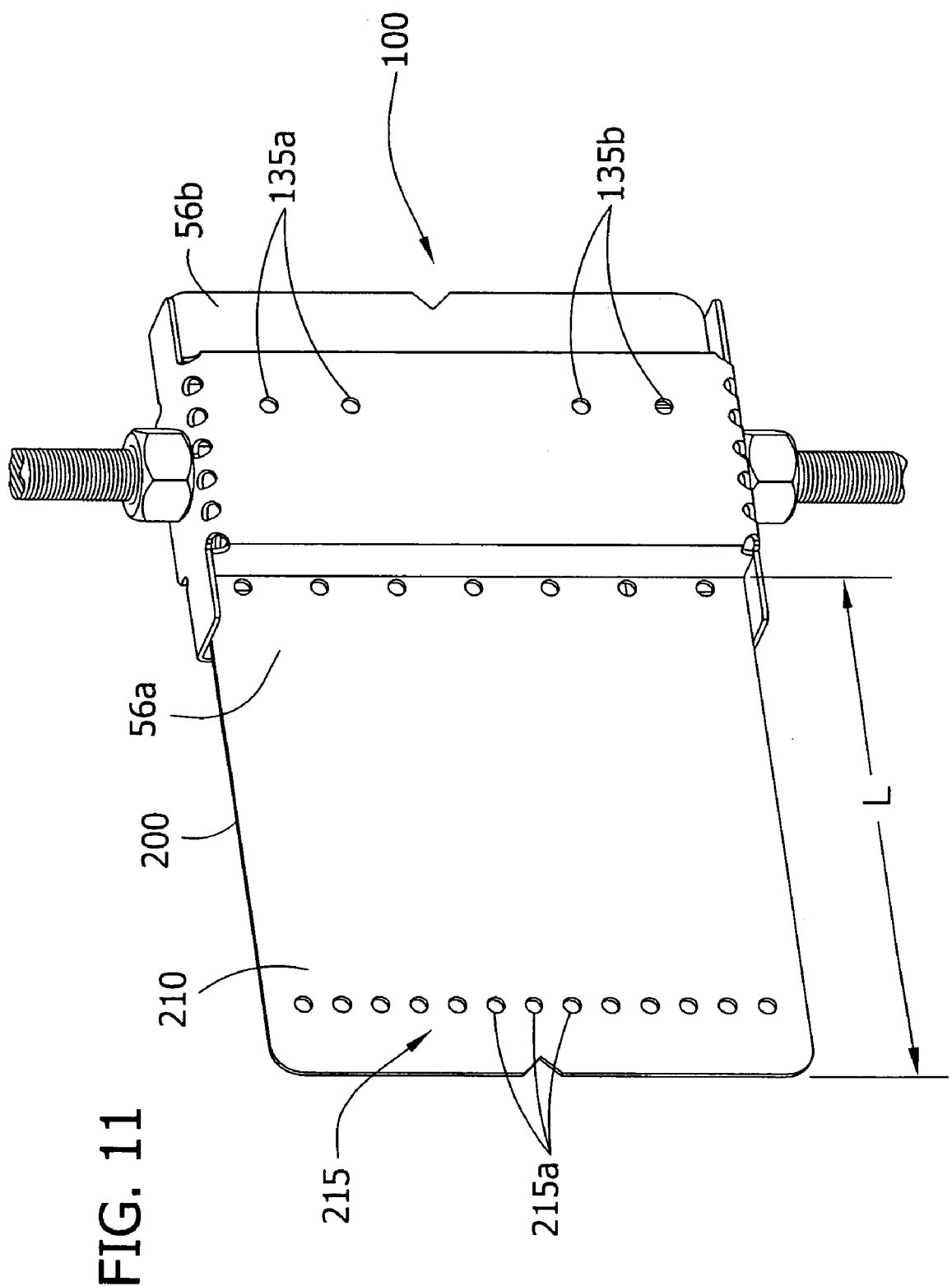
FIG. 11 is a front perspective view of a bracket of the present invention having an extension plate at one side thereof.
Figure 12:
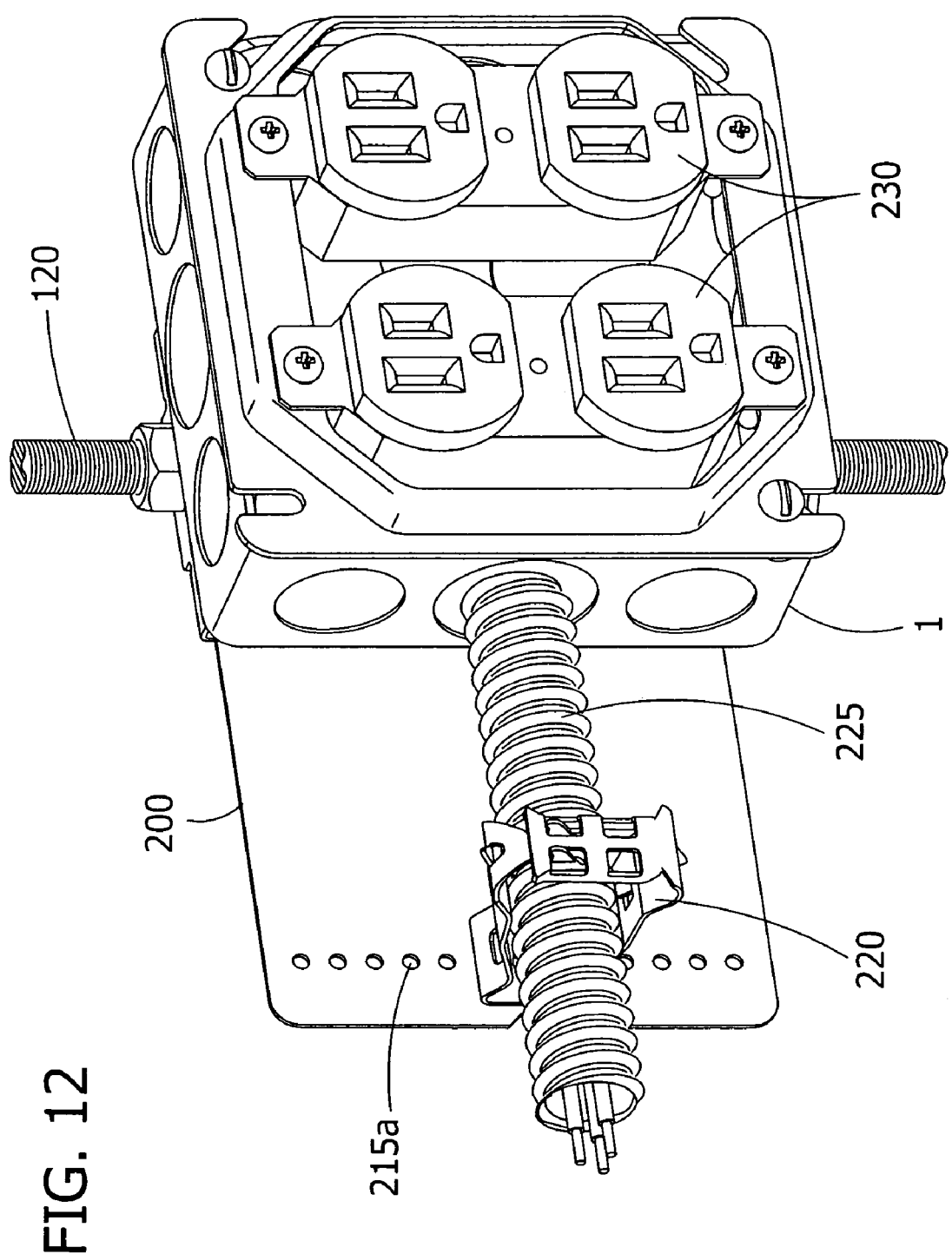
FIG. 12 is the same view as FIG. 11 with an electrical box and associated pre-wired electrical device secured to the bracket.

Referring to FIGS. 11 and 12, in another embodiment of the present invention, the bracket 100 has a thin, generally rectangular extension flap 200 extending generally laterally from one flange 56a of the bracket in a direction away from the central section 43 of the bracket. Other shapes of the extension flap 200 are contemplated and within the scope of this invention. In the illustrated embodiment, the extension flap 200 is integral with the flange 56a, but it is understood that the flap may be non-integral with the flange and/or may be removable from the flange, or may have any number of configurations. The extension flap 200 has an outboard end margin 210 comprising at least one clamp fastener element (generally indicated at 215) for use in securing a clamp 220 to the extension flap. This design is especially suited for meeting certain code requirements. To this regard, for pre-wired electrical devices of the type employing one or more flexible conduits, code regulations specify that the flexible conduits must be secured within 8 inches of the electrical box. As shown in FIG. 12, the clamp 220 secured to the extension flap 200 is used to support a conduit 225 (e.g., a flexible conduit of the type used with pre-wired electrical devices) running from the electrical box 1. Preferably, the extension flap 200 has a length L that is between about 3 and 6 inches so that one or more flexible conduits 225 from a pre-wired electrical device 230 may be secured to the extension flap within the required 8 inches of the box 1. The length L of the extension flap 200 may vary without departing from the scope of this invention. In the illustrated embodiment, the clamp fastener element 215 comprises a plurality of vertically aligned openings 215a in the flap 200 for receiving one or more fasteners for fastening one or more clamps 220 to the extension flap. Other types of clamp fastener elements are contemplated.

Although the illustrated embodiment only shows one extension flap 200, it is contemplated that the bracket 100 may have more than one extension flap. Other configurations of the extension flap 200 are also contemplated and within the scope of this invention. It is also contemplated that the extension flap 200 of the present invention may be disposed at other locations on the bracket 100, and/or may be configured for use in supporting flexible conduits when the electrical box and associated pre-wired electrical device are mounted on a horizontal mounting bar device using the bracket of the present invention.

The bracket 100, including the extension flap 200, is preferably formed from one piece of metal using a progressive die assembly in a stamping operation, or by other means known in the art.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A bracket for mounting an electrical box on a mounting bar device of the type having an elongate bracket mounting section and a pair of fastening sections at opposite ends of the bracket mounting section adapted to be secured to spaced apart wall studs such that the bracket mounting section extends between the wall studs when the sections are secured to the studs, the bracket comprising
    a central section having opposite ends and a generally channel-shaped recess therein extending from one end of the central section to the opposite end of the central section,
    at least a first fastener element for use in securing the electrical box to the central section of the bracket,
    end sections at the opposite ends of the central section having bar device openings generally aligned with the channel-shaped recess of the central section, the channel-shaped recess and the aligned bar device openings being adapted to slidably receive the bracket mounting section of the mounting bar device whereby the bracket may be slidably moved along the bracket mounting section to a selected position, and
    at least a second fastener element for use in securing at least one of the end sections of the bracket to the bracket mounting section of the mounting bar device in said selected position, wherein the central section of the bracket comprises a rear wall and upper and lower side walls projecting forward from the rear wall to define the channel-shaped recess, a top flange extending up from the upper side wall, and a bottom flange extending down from the lower side wall.

2. A bracket as set forth in claim 1 wherein said first fastener element comprises at least one box fastener opening in the central section of the bracket for receiving at least one box fastener.

3. A bracket as set forth in claim 1 wherein said second fastener element comprises at least one bracket fastener opening in at least one end section of the bracket for receiving at least one bracket fastener.

4. A bracket as set forth in claim 1 wherein the top and bottom flanges are substantially coplanar and wherein the first fastener element comprises a row of box fastener openings in at least one of the top and bottom flanges.

5. A bracket as set forth in claim 1 wherein said end sections at opposite ends of the central section of the bracket comprise regions substantially coplanar with the top and bottom flanges of the central section of the bracket.

6. A bracket as set forth in claim 5 wherein said second fastener element comprises a slot in each of the end sections for receiving a bracket fastener.

7. A bracket as set forth in claim 1 wherein each of the end sections has a rod opening therein, the end sections being adapted to be bent from a first mounting bar configuration in which said bar device openings in the end sections are generally horizontally aligned for receiving the bracket mounting section of the mounting bar device to a second different mounting rod configuration in which the rod openings in the end sections are generally vertically aligned for receiving a vertical mounting rod to mount the bracket on the mounting rod.

8. A bracket as set forth in claim 7 wherein the end sections are bendable between said first mounting bar configuration and said second mounting rod configuration on bend lines formed by lines of weakness extending across the end sections generally adjacent opposite ends of the central section of the mounting bracket.

9. A bracket for mounting an electrical box on a mounting bar device of the type having an elongate bracket mounting section and a pair of fastening sections at opposite ends of the bracket mounting section adapted to be secured to spaced apart wall studs such that the bracket mounting section extends between the wall studs when the sections are secured to the studs, the bracket comprising
    a central section having opposite ends and a generally channel-shaped recess therein extending from one end of the central section to the opposite end of the central section,
    at least a first fastener element for use in securing the electrical box to the central section of the bracket,
    end sections at the opposite ends of the central section having bar device openings generally aligned with the channel-shaped recess of the central section, the channel-shaped recess and the aligned bar device openings being adapted to slidably receive the bracket mounting section of the mounting bar device whereby the bracket may be slidably moved along the bracket mounting section to a selected position, and
    at least a second fastener element for use in securing at least one of the end sections of the bracket to the bracket mounting section of the mounting bar device in said selected position,
    wherein each of the end sections has a rod opening therein, the end sections being adapted to be bent from a first mounting bar configuration in which said bar device openings in the end sections are generally horizontally aligned for receiving the bracket mounting section of the mounting bar device to a second different mounting rod configuration in which the rod openings in the end sections are generally vertically aligned for receiving a vertical mounting rod to mount the bracket on the mounting rod, and
    wherein the central section of the mounting bracket comprises a rear wall and side walls projecting forward from the rear wall, and wherein each end section has a generally Z-shaped configuration comprising a first region formed with a respective rod opening and extending from the rear wall of the central section, a second region formed with a respective bar device opening and extending generally from the first region, and a third region formed with the first fastener element and extending from the second region.

10. A bracket as set forth in claim 1 in combination with a pre-wired electrical box secured to the central section of the mounting bracket, said first fastener element comprising at least one bracket fastener opening for receiving a bracket fastener, the at least one bracket fastener opening being unobscured by the electrical box secured to the mounting bracket to facilitate securement of the mounting bracket to the mounting bar device via the at least one bracket fastener.

* * * * *